United States Patent [19]
Ng

[11] Patent Number: 5,455,681
[45] Date of Patent: Oct. 3, 1995

[54] LOW RESOLUTION GREY LEVEL PRINTING METHOD FROM HIGH RESOLUTION BINARY INPUT FILE

[75] Inventor: Yee S. Ng, Fairport, N.Y.

[73] Assignee: Eastman Kodak Company, Rochester, N.Y.

[21] Appl. No.: 976,915

[22] Filed: Nov. 16, 1992

[51] Int. Cl.⁶ .................... H04N 1/387; H04N 1/40; G06F 15/00
[52] U.S. Cl. .................... 358/298; 358/455; 358/462; 395/128
[58] Field of Search .................... 358/298, 296, 358/300, 302, 443, 448, 455, 462, 530, 532, 540; 346/107 R, 160; 395/108, 128, 144–147; 382/54, 55

[56] References Cited

U.S. PATENT DOCUMENTS

| | | | |
|---|---|---|---|
| 4,746,941 | 5/1988 | Pham et al. | 364/519 |
| 4,831,395 | 5/1989 | Pham et al. | 346/160 |
| 4,876,976 | 11/1989 | Takao et al. | 358/462 |
| 4,885,576 | 12/1989 | Pennebaker et al. | 382/56 X |
| 4,885,597 | 12/1989 | Tschang et al. | 364/519 |
| 4,907,096 | 3/1990 | Stansfield et al. | 358/456 |
| 4,910,603 | 3/1990 | Hirahara et al. | 358/298 |
| 4,941,004 | 7/1990 | Pham et al. | 346/160 |
| 4,964,070 | 10/1990 | Markoff et al. | 364/523 |
| 5,025,322 | 6/1991 | Ng | 358/298 |
| 5,029,107 | 7/1991 | Lee | 395/108 |
| 5,126,759 | 6/1992 | Small et al. | 358/302 X |
| 5,138,337 | 8/1992 | Ng | 358/298 X |
| 5,153,936 | 10/1992 | Morris et al. | 395/128 |
| 5,185,674 | 2/1993 | Tai | 358/457 |
| 5,250,963 | 10/1993 | Smith et al. | 346/160 |
| 5,255,013 | 10/1993 | Ng et al. | 346/107 R |
| 5,270,827 | 12/1993 | Kobayashi et al. | 358/298 |
| 5,299,028 | 3/1994 | Kwarta | 358/443 X |
| 5,327,524 | 7/1994 | Ng | 395/108 |

Primary Examiner—Benjamin R. Fuller
Assistant Examiner—Eric Frahm
Attorney, Agent, or Firm—Norman Rushefsky

[57] ABSTRACT

An electronic printing apparatus and method transforms a high resolution binary data file to a lower resolution grey level file for printing by a lower resolution printer. Recording is made upon an electrophotographic recording medium preferably employing discharged area development. In order to preserve sharpness to the printed image and reduce edge jaggedness in the recorded image, exposures for grey level pixels are skewed towards the longer durations. In addition, pixel locations in the original binary data file are used to determine the need for pixel shifting during recording of the printed grey level pixels.

34 Claims, 11 Drawing Sheets

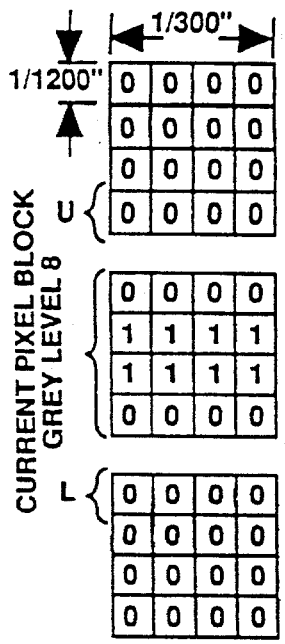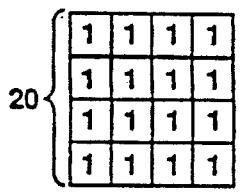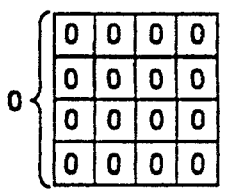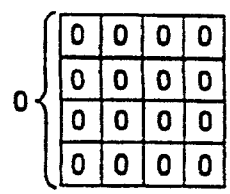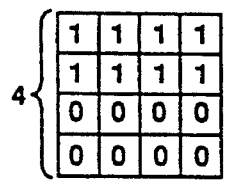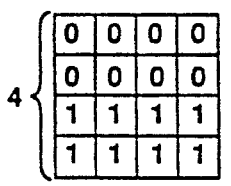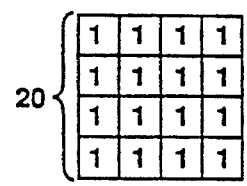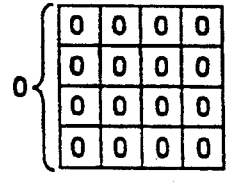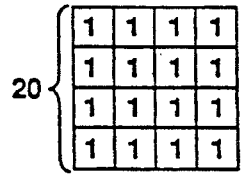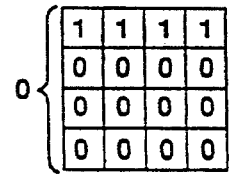
FIG. 10a   FIG. 10b   FIG. 10c   FIG. 10d
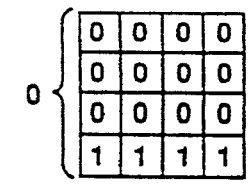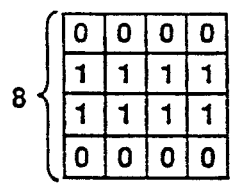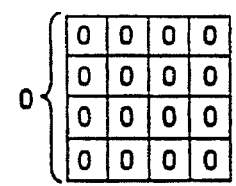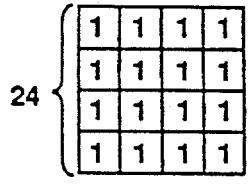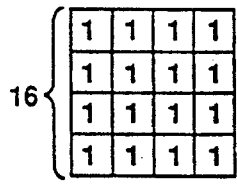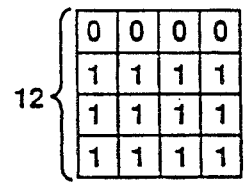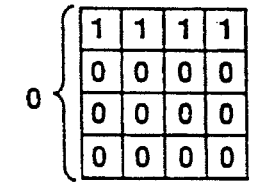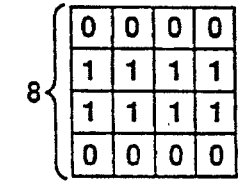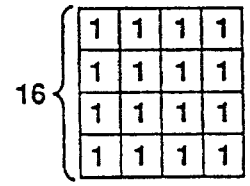
FIG. 10e   FIG. 10f   FIG. 10g

LOW RESOLUTION GREY LEVEL PRINTING METHOD FROM HIGH RESOLUTION BINARY INPUT FILE

BACKGROUND OF THE INVENTION

1. Field of the Invention

The invention relates to the field of printing using a raster printer, and more specifically, to the field of high resolution printing of text using such printers and particularly in electrophotographic applications.

2. Description Relative to the Prior Art

In the prior art, the printing of high quality text is typically done using high resolution laser printers. Thus, where commercial quality printing is desired laser printers using 600, 800 or 1200 dots per inch(dpi) are used. Such printers are relatively expensive. LED printers are less expensive but currently provide a resolution only to 400 dots per inch. While these LED printers are capable of producing letter quality images, these images may not be suited to more demanding printing requirements.

U.S. Pat. No. 4,964,070 describes a technique for printing data generated by a word processing program or similar software that has been used to prepare a document and to place that document into a text file. A different program, such as the PostScript® program from Adobe Systems, Inc. formats the document in that text file into a page description file for output to a raster printer. A computer associated with the printer enlarges the text in both the horizontal and vertical directions and this enlarged text is printed onto sheets using a 300 dots-per-inch printer such as a laser, LED or ink-jet printer. The sheets are then photo-reduced to provide camera-ready pages of word processing text that is of high quality.

SUMMARY OF THE INVENTION

It is an object of the invention to provide high quality text reproduction with use of relatively inexpensive raster printers without the disadvantage of the prior art requiring the preparation of intermediate enlarged images that are subsequently photo-reduced.

This and other objects and advantages which will become apparent upon reading of the specification are realized by a method of printing high quality text with a low resolution printer, said method comprising the steps of generating a high resolution binary data text file of said text represented in binary data form; sequentially operating on blocks of binary data to define multibit grey level pixel data of lower resolution for recording by said printer; and printing said pixel data to form the text by operating the printer to record grey level pixels at the lower resolution.

BRIEF SUMMARY OF THE DRAWINGS

FIG. 10 are illustrations of 4×4 binary pixel blocks that are provided to explain the concept of preservation of sharpness information in accordance with use of a grey level printer.

DESCRIPTION OF THE PREFERRED EMBODIMENT

The methods and apparatus of the preferred embodiments will be described in accordance with an electrophotographic recording medium. The invention, however, is not limited to methods and apparatus for creating images on such a medium, as other media such as thermal, ink jet, electrographic or photographic film etc. may also be used with the invention.

Because electrophotographic reproduction apparatus are well known, the present description will be directed in particular to elements forming part of or cooperating more directly with the present invention. Apparatus not specifically shown or described herein are selectable from those known in the prior art.

Figure 1:
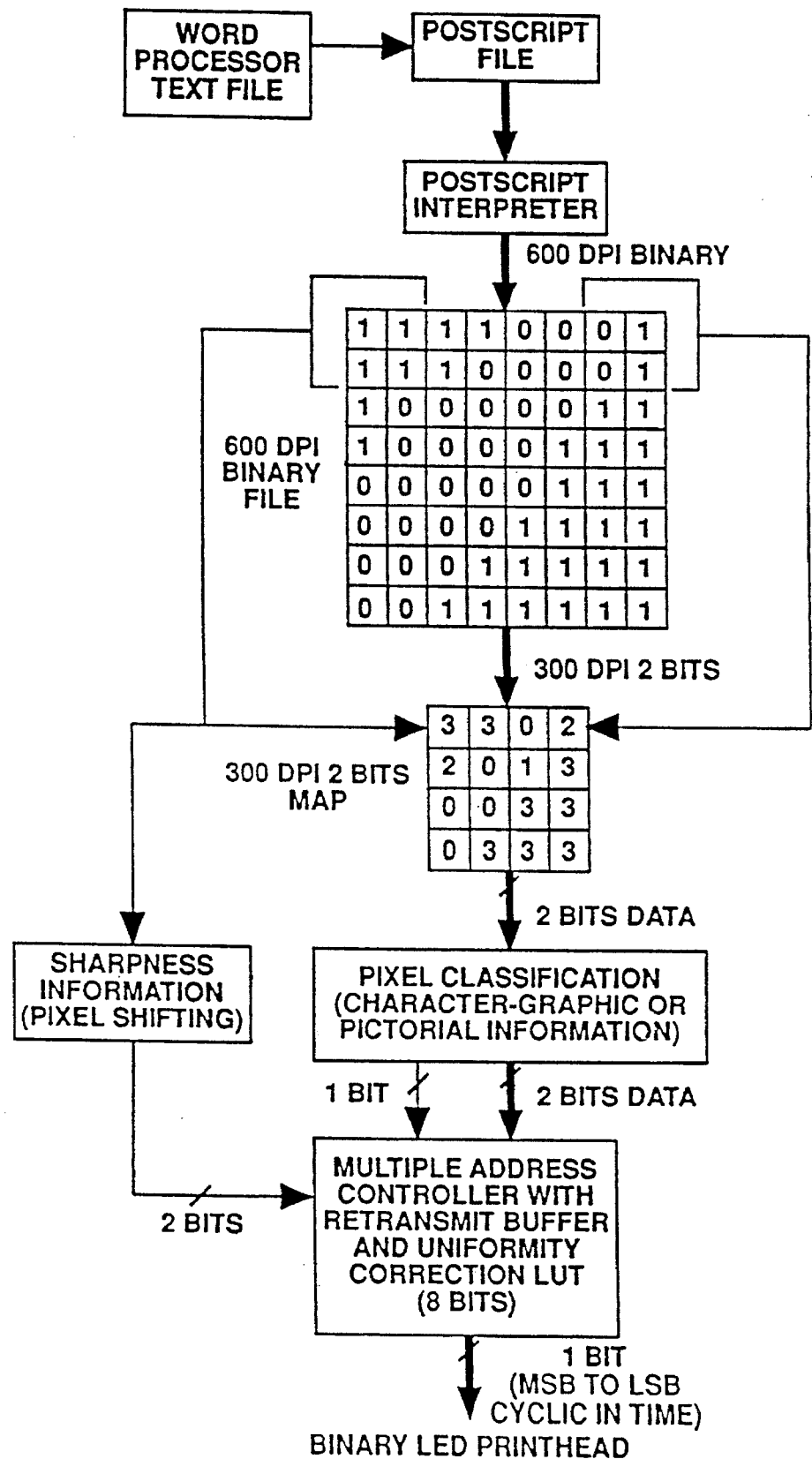
FIG. 1 is a flowchart illustrating one embodiment of the printing method of the invention.

With reference to FIG. 1, there is shown a block diagram of the data flow for implementation of one embodiment of the invention with multiple address printing using a binary LED printhead to be described in more detail below. A word processor text file prepared using an appropriate word processing program is formatted into a PostScript® file or other page description language file which in turn is rendered by a PostScript® interpretter into a high resolution (600 dpi) binary image file. The 600 dpi binary image file is converted to a 300 dpi 2 bits/pixel grey level file by taking sequential 2×2 binary data bit blocks and adding the binary "1" bits in the 2×2 bit areas and mapping the sum into a 300 dpi, 2-bits per pixel map. Since 2-bits define a maximum grey level of 3, sums of 3 or 4 are designated at grey level 3. Each of the 2-bits per pixel image data now stored at a resolution of 300 dpi is subjected to a classification to optimize printing thereof in accordance with the processing conditions for printing. Typically, when one uses higher bit depth systems (like 4-bits per pixel), one finds that using an equal lightness (on the output achromatic print) exposure generates a good result for both text and halftone. However, with a lower bit depth of just 2-bits per pixel) optimal results particularly as to smoothness of edges are achieved by a skewed exposure for text and graphics whereas pictorial subject matter is exposed using equal lightness exposure steps. Thus, in accordance with one aspect of the invention the pixels are classified as either text-graphics or pictorial. This is relatively easily done since the page description language contains or may be amended to contain information relative to the different areas of each page as to these classifications.

Figure 2:
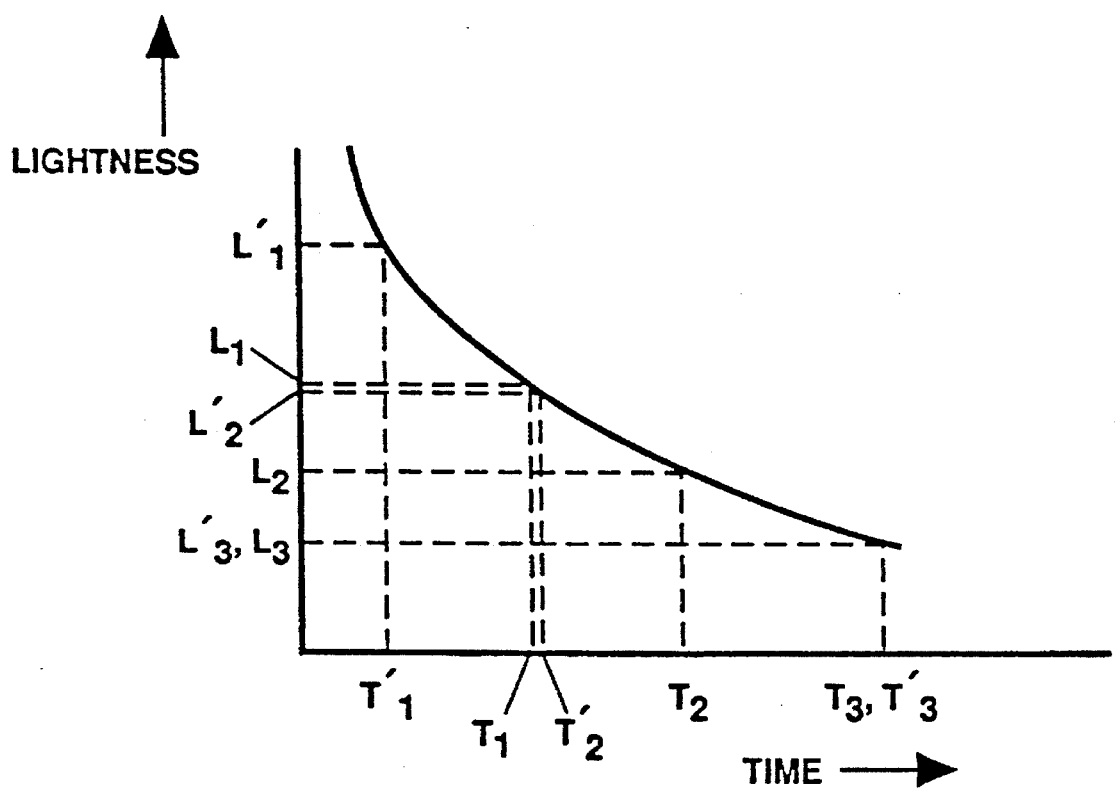
FIG. 2 is a graph illustrating a relationship between density and exposure time in accordance with one aspect of the printing method of the invention.

With reference to FIG. 2, a graph is provided indicating schematically a curve of lightness vs. exposure time for use in a typical electrophotographic printer that employs discharged imaging development also known as reversal development or neg-pos development. For a typical LED, the three available exposure levels would typically be expected to be arranged to provide equal lightness steps or jumps between L'1, L'2 and L'3 over the broad range of the electrophotographic process. This broad exposure range is defined as where the lightness vs. exposure time curve is approximately vertical to where the curve becomes approximately horizontal. In accordance with the invention, where the bit depth is low (i.e., only 2-bits per pixel to define all the grey levels) the available exposures for recording pixels classified as text-graphics are skewed toward the high end (long exposures) particularly for text-graphics. Thus, lightness values $L_1$, $L_2$ and $L_3$ have corresponding exposure times over $T_1$, $T_2$ and $T_3$ which do not extend over the entire broad exposure range but instead, as shown, are skewed towards the long exposure end. The reason for this is that for text-graphics printing, the sharpness information on the edge is very important and a discharged area development process appears to provide, for low bit depths, better edge sharpness when exposures are so skewed. On the other hand, for pictorial information, edge sharpness is less important but density contouring is more important and exposures providing equal lightness steps are preferred.

Edge sharpness is further obtained by examining each 2×2 binary data bit blocks and characterizing the arrangement of pixels therein for purposes of shifting the printed grey level pixel to enhance the printed edge.

The operation of one form of printer apparatus that is capable of providing these exposures will now be described with reference to FIG. 3.

Figure 3:
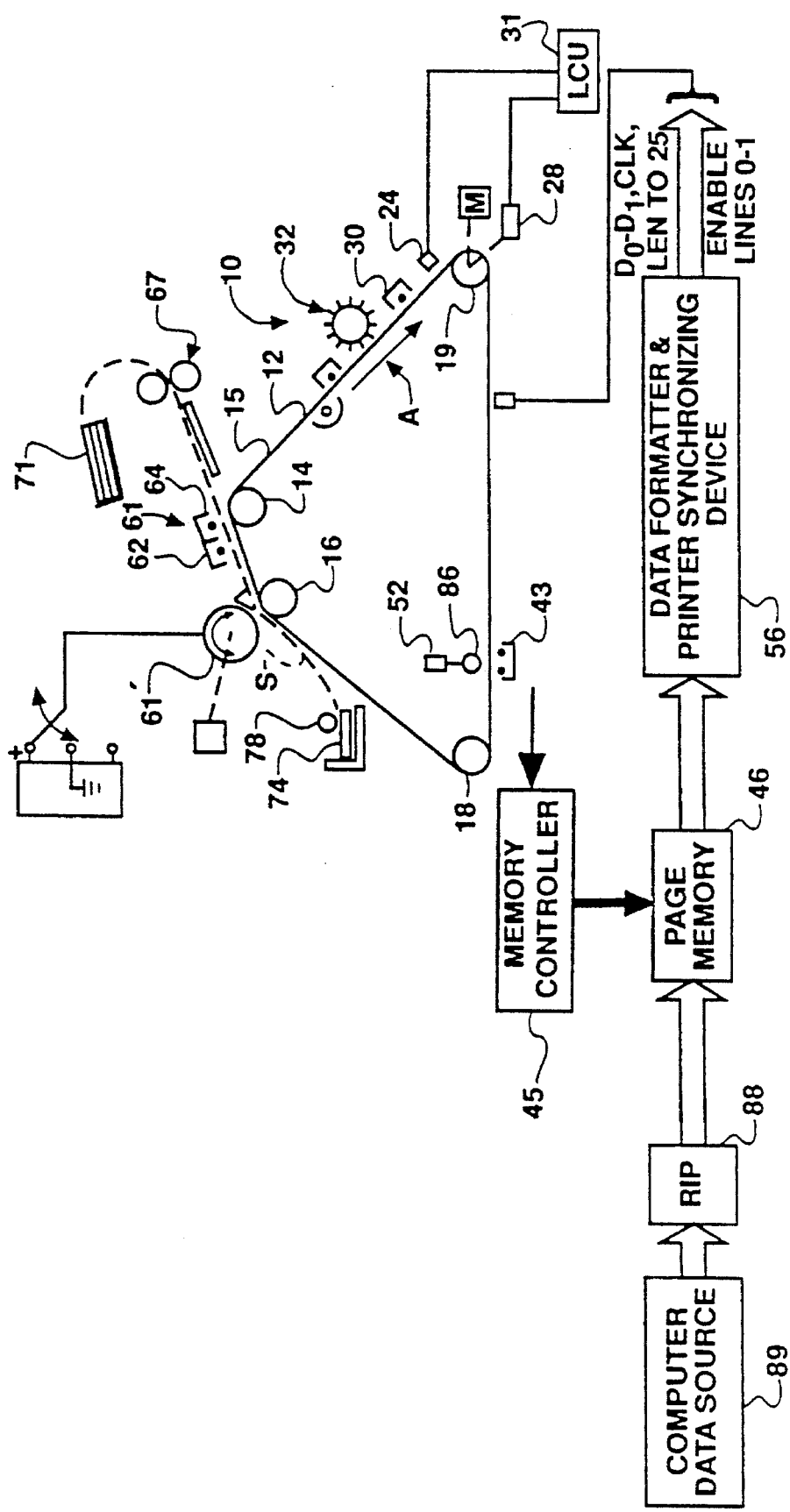
FIG. 3 is a schematic of an electrophotographic printer apparatus that is in accordance with one embodiment of the invention.

With reference now to FIG. 3, an electrophotographic reproduction apparatus 10 includes a recording medium or photoreceptor such as a photoconductive web 12 or other photosensitive medium that is trained about four transport rollers 14, 16, 18 and 19, thereby forming an endless or continuous web. Roller 19 is coupled to a driver motor M in a conventional manner. Motor M is connected to a source of potential when a switch (not shown) is closed by a logic and control unit (LCU) 31. When the switch is closed, the roller 19 is driven by the motor M and moves the web 12 in a clockwise direction as indicated by arrow A. This movement causes successive image areas or image frames of the web 12 to sequentially pass a series of conventional electrophotographic work stations of the reproduction apparatus.

For the purposes of this disclosure, several work stations are shown along the web's path. These stations will be briefly described.

First, a charging station 30 is provided at which the photoconductive surface 15 of the web 12 is sensitized by applying to such surface a uniform electrostatic primary charge of a predetermined voltage. The output of the charger may be controlled by a grid connected to a programmable power supply (not shown). The supply is, in turn, controlled by the LCU 31 to adjust the voltage level Vo applied onto the surface 15 by the charger 30.

At an exposure station, an electrostatic image is formed by modulating the primary charge on an image area of the photoconductive surface with selective energization of point-like radiation sources in accordance with signals provided by a data source to be described. The point-like radiation sources are supported in a printhead 25 also to be described in more detail below.

A development station 43 includes developer which may consist of iron carrier particles and electroscopic toner particles. Single component developers are also contemplated. The toner particles are electrostatically charged of the same polarity as that of the latent electrostatic image. Developer is brushed over the photoconductive surface of the web 12 and toner particles adhere to the exposed areas of the latent electrostatic image to form a visible transferable image in accordance with well known reversal development techniques. The development station may be of the magnetic brush type with one or two rollers. Where toner particles of other colors are also to be used, additional stations for such colors will be provided. Typically, a color copier might include cyan, magenta and yellow color toner stations.

The apparatus 10 also includes a transfer station 61 shown with a pair of corona chargers 62, 64 at which the toner image on web 12 is transferred in register to a copy sheet S; and a cleaning station 32, at which the photoconductive surface of the web 12 is cleaned of any residual toner particles remaining after the toner images have been transferred. After the transfer of the unfixed toner images to a copy sheet S, such sheet is transported to a heated pressure roller fuser 67 where the image is fixed to the copy sheet S and the sheet is then transported to a tray 71. Suitable means, such as a transfer drum 61', may be provided for duplex operation in accordance with known techniques as well as for providing multicolor copies, as is also well known. See, for example, U.S. Pat. No. 4,791,450, the pertinent contents of which are incorporated herein by this reference.

As shown in FIG. 3, a copy sheet S is fed from a supply 74 by driver roller 78, which then urges the sheet to move forward onto the web 12 in alignment with a toner image.

To coordinate operation of the various work stations with movement of the image areas on the web 12 past these stations, the web has a plurality of indicia such as perforations along one of its edges. These perforations generally are spaced equidistantly along the edge of the web 12. At a fixed location along the path of web movement, there is provided suitable encoding means 24 for sensing web perforations. This sensing produces input signals into the LCU 31 which has a digital computer, preferably one or more microprocessors. The LCU has a stored program responsive to the input signals for sequentially actuating, then deactuating, the work stations as well as for controlling the operation of many other machine functions. Additional encoding means 28 may be provided as known in the art for providing more precise timing signals for control of the various functions of the apparatus 10 as will be described below.

Programming of a number of commercially available microprocessors is a conventional skill well understood in the art. This disclosure is written to enable a programmer having ordinary skill in the art to produce an appropriate control program for the one or more microprocessors used in this apparatus. The particular details of any such program, would, of course, depend on the architecture of the designated microprocessor(s).

Figure 4:
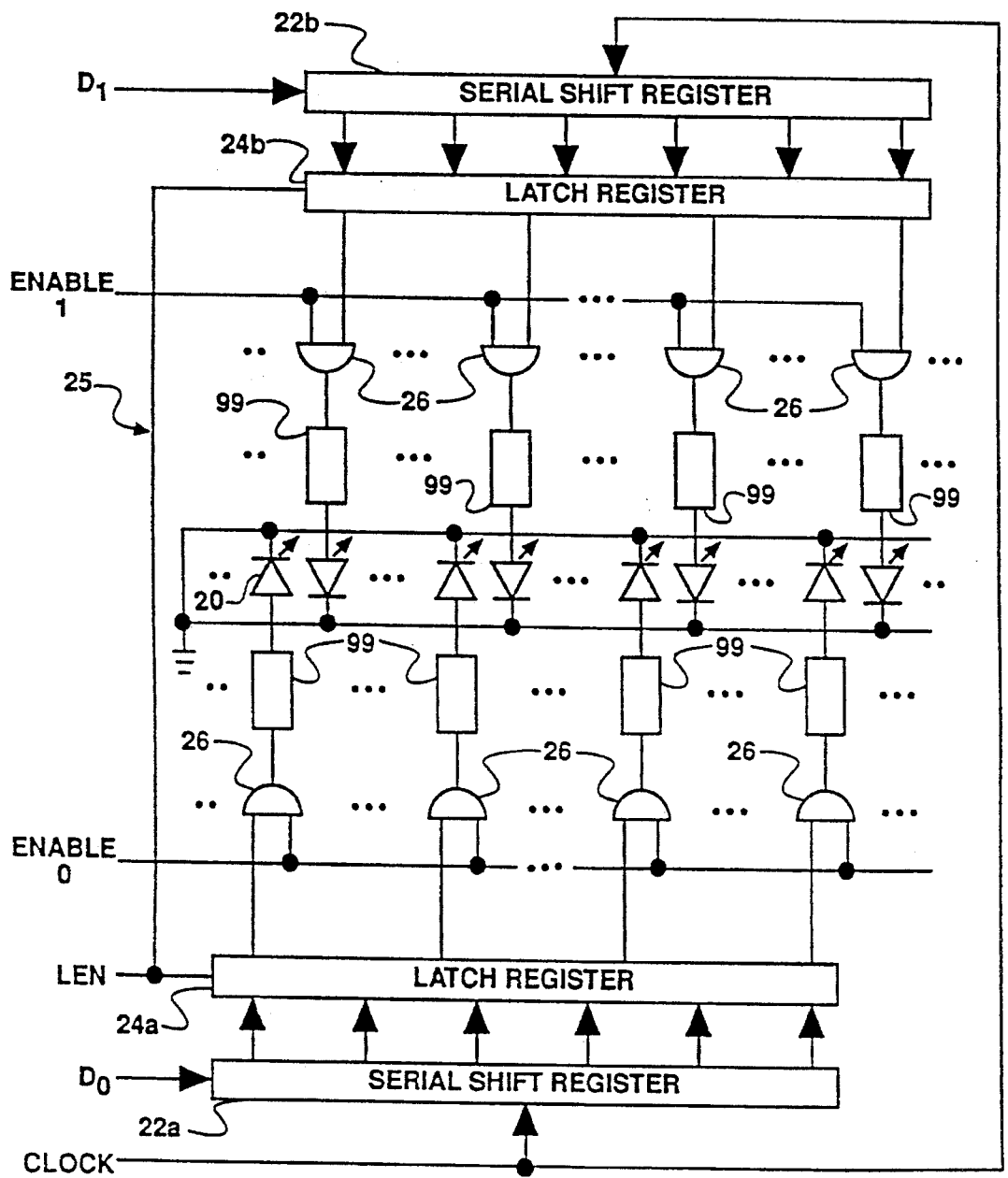
FIG. 4 is a schematic of a binary LED printhead of the prior art that is used in accordance with the printing method and apparatus of the invention.

With reference to both FIGS. 3 and 4, the printhead 25, as noted, is provided with a multiplicity of energizable point-like radiation sources 20, preferably light-emitting diodes (LEDs). Optical means (not shown) may be provided for focusing light from each of the LEDs onto the photoconductive surface. The optical means preferably comprises an array of optical fibers such as sold under the name Selfoc, a trademark for a gradient index lens array sold by Nippon Sheet Glass, Limited. Due to the focusing power of the optical means, a row of emitters will be imaged on a respective transverse line on the recording medium.

The printhead 25 comprises a suitable stationary support with a series of LED chip arrays mounted thereon. As is well known, each of the LED chip arrays includes, for example, 96 LEDs arranged in a single row at a uniform spacing of 300 dots per inch. These chips are also arranged end-to-end in a row and where twenty-seven LED chip arrays are so arranged, the printhead will extend across the width of the web 12 and include say 2592 LEDs arranged in a single row. To each side of this row of LEDs, there may be provided, for example, twenty-seven identical driver chips. Each of these driver chips include circuitry for addressing the logic associated with each of 48 LEDs to control whether or not each of the LEDs should be energized as well as current driver circuitry 99 to control the level of current to each of the LEDs controlled by that driver chip. In this example, two driver chips are thus associated with each LED chip array. Each of the two driver chips will be coupled for driving of alternate LEDs, i.e., one of the driver chips will drive the odd-numbered LEDs in a particular LED chip array. Thus, one driver chip will drive the 48 odd numbered LEDs of the 96 LEDs in the array and the other driver chip will drive the 48 even numbered LEDs of these 96 LEDs. Only some the LEDs are illustrated in FIG. 4, it being understood that many more LEDs are present. The driver chips on each side of the printhead are suitably coupled together in groups to serially shift data between those in a group. Thus, shift register 22a represents the combination of the shift registers in 27 driver chips.

The printer apparatus includes a raster image processor (RIP) 88 that rasterizes data from a computer 89 or word processor. This rasterized data represents the grey level of each pixel to be recorded and, in the case of a color copier or printer, may contain data bits indicating the color that it is to be printed in. As noted above, this data is transformed from a 600 dpi binary file to a 300 dpi grey level file by the RIP 88 and stored in page memory 46. This data, however, must be modified before printing so that it is modified for the particular process conditions of this printer and for the characteristics of the particular LEDs that will be used to record the particular pixels of data.

In response to pulses from encoders 24 and 28 identifying a new image frame on a photosensitive web, the LCU provides an output signal via a memory controller 45 to the page memory to remove one line of data. This data is fed to a printer output device 56 for formatting the data and synchronizing the operation thereof. This output device is illustrated by the data formatter and printer synchronizing device shown in FIG. 5.

Figure 5:
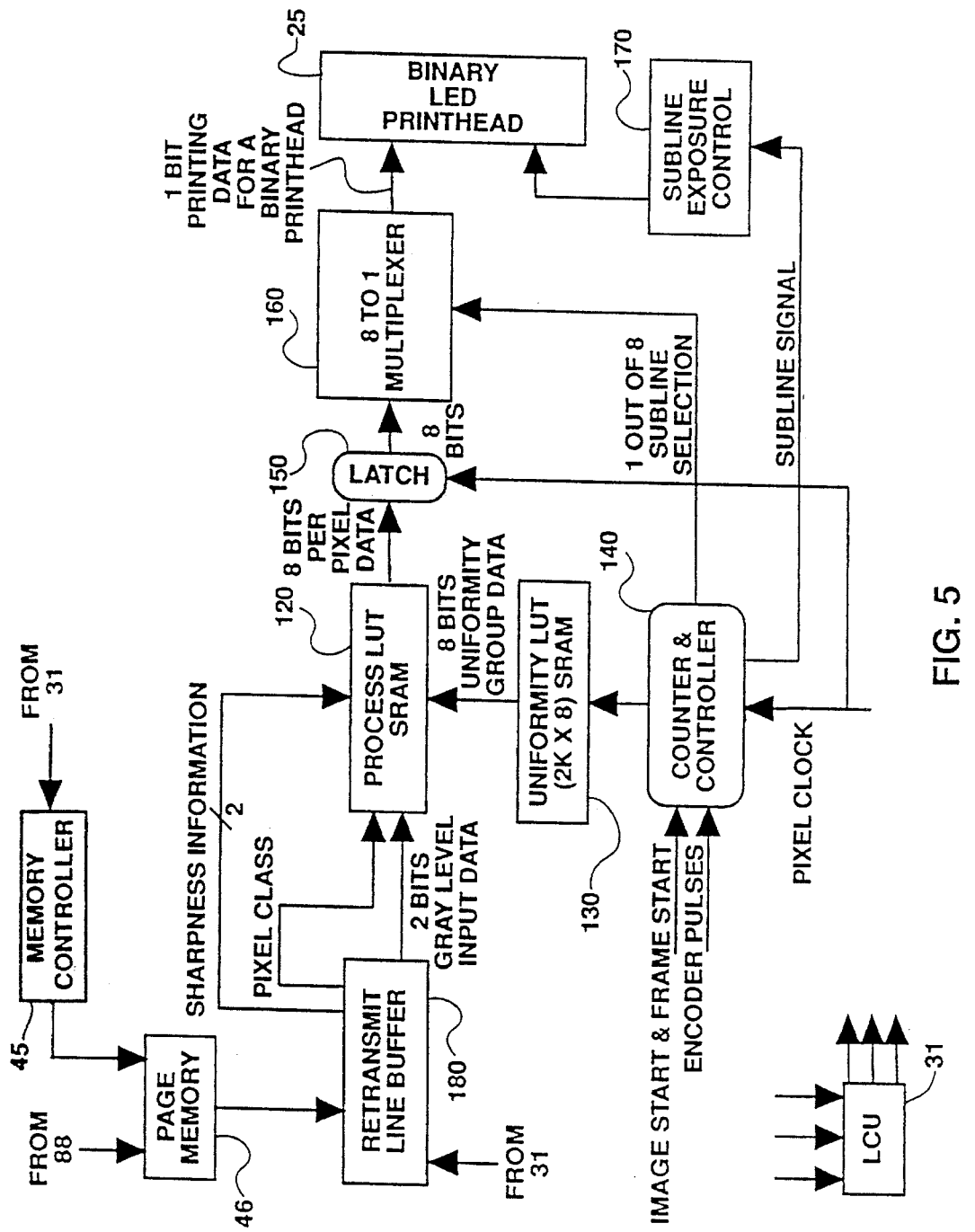
FIG. 5 is a schematic of a printer interface circuit made in accordance with the apparatus of the invention and shown in combination with the printhead of FIG. 4.

With reference now to FIG. 5, a signal representing the 2-bits per pixel input data calculated in FIG. 1 is input to a retransmit line buffer 180 and then to a process look-up table (LUT) memory 20 such as an SRAM. Also input into memory 120 is an 8-bit signal representing a brightness characteristic of the particular LED that is to print the instant two bits/pixel signal and a signal indicating if the area in which this pixel is in is classified as text-graphic or pictorial (continuous tone or halftone). Where the LED printhead 25 includes several thousand LEDs, as is well known, these LEDs will likely have different brightness characteristics even though enabled by similar signals. After measuring these brightness characteristics, LEDs having similar brightness characteristics may be identified by an 8-bit code. This code is stored in a uniformity LUT SRAM memory 130. A counter and controller 140 is responsive to encoder pulses designating a new sub-line for recording. In this embodiment, each grey level pixel is recorded over 8 sub-lines as will be further described below using a binary architectured printhead. An encoder, responsive to movement of the recording member, such as photoconductive web 12, generates pulses in response to increments in web movement. These pulses may either be directly generated in response to web movement or combined with pseudo-encoder pulses. In the case of the latter, a pulse generated in response to web movement then enables an oscillator to artificially generate say 7 or 8 equally spaced in-time encoder pulses to indicate each new sub-line for recording a part of the pixel. In any event a new sub-line indicating encoder pulse resets a counter and controller 140 which is counting pixel clock pulses from the logic and control unit (LCU) 31. This count is used to identify a particular LED. The count from the counter 140 is output as an address to memory 130 which for that LED outputs an 8-bit signal or code identifying the intensity characteristics of that LED. This latter 8-bit signal in combination with the 2-bit grey level input signal (in conjunction with other inputs) identifies an 8-bit signal stored in memory 120 representing an exposure time period for recording the 2-bit grey level pixel signal by that particular LED. Memory 120 includes two tables, one for pixels classified as text-graphics and the other for pixels classified as pictorial. Description of an embodiment that also adjusts data for sharpness information will be discussed below. These two tables provide exposure times appropriate for the particular classification, grey level and LED characteristic. An 8-bit latch 150 stores this 8-bit time-related signal. A multiplexer 160 then selects one of these 8-bits for transmission to the binary printhead 25.

The multiplexer 60 selects one of the 8-bits in the latch 50 in response to a 1 out of 8 sub-line selection signal from controller 140. This selection signal remains constant until a particular binary data bit is selected for all the LEDs. Thus, for example, for the first sub-line the least significant bit for all the LEDs may be selected for transmittal to the binary printhead. As the counter 140 counts pixel clock pulses, the count represents an address for a different LED. The characteristics of that LED are output from LUT 130 and input into LUT 120 along with the 2-bits per pixel data for that LED and pixel classification signal as an address. In response to this address, an 8-bits per pixel printing data signal is sent to latch 50. The multiplexer selects one of these bits as described above and this is repeated for each pixel in the line of pixels to be recorded. For the next sub-line, the signal processing repeats with retransmission of the inputs to memory LUT from retransmit line buffer 180 and the multiplexer selects a different bit for each of the LEDs. The retransmit line buffer 180 stores data information for a line of pixels including grey level of each pixel, pixel class and sharpness information and retransmits this line of data 8 times to LUT 120. Thus, a different data bit for each LED is sent to the printhead 8 times for recording the 8 sub-lines of exposures. Further details regarding operation of this type of binary printhead are provided in U.S. application Ser. No. 07/609,868, U.S. Pat. No. 5,255,013, filed in the names of Ng et al on Nov. 7, 1990, the contents of which are incorporated herein by this reference.

The binary architectured printhead 25, as noted above, is of typical structure and architecture, and includes a shift register that serially shifts data bits down the register. The operation of such a binary printhead is well known and reference may be had to the aforementioned application or to, for example, U.S. Pat. No. 4,941,004, the contents of which are incorporated herein. Such printheads are characterized by having a data register for each recording element for storing a single data bit for determining whether or not the respective recording element should be enabled during a particular sub-line recording interval.

A sub-line exposure control device serves to provide control signals to energize the LEDs to be enabled during that sub-line for a fixed sub-line period associated with that particular sub-line. The duration of an exposure period may vary for each sub-line or may be the same for each sub-line in this regard see U.S. Pat. No. 5,138,337, the contents of which are incorporated herein.

Figures 6A, 6B, 6C, 6D, 6E, 6F:
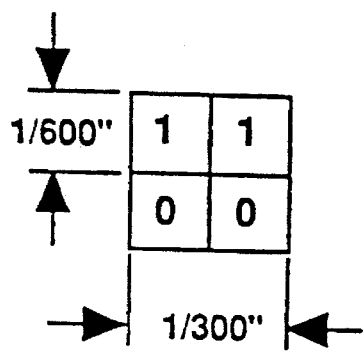
FIGS. 6 through 8 are illustrations of 2×2 binary pixel blocks that are provided to explain the concept of sharpness information.
Figure 7A:
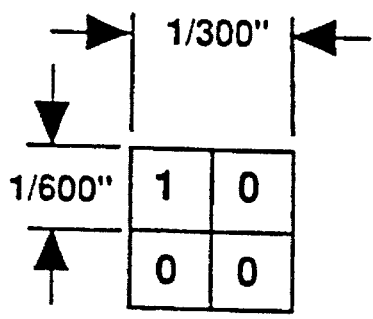
Figure 7B:
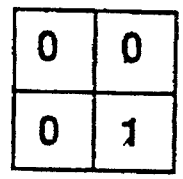
Figure 7C:
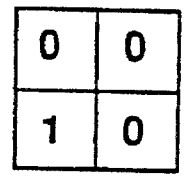
Figure 7D:
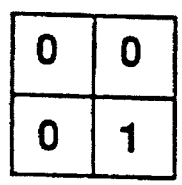
Figure 8:
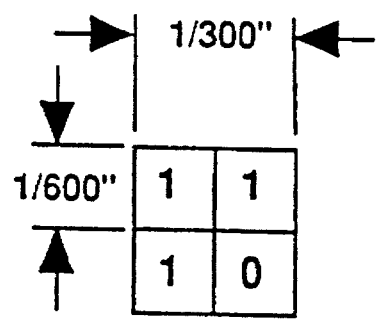

With reference now to FIGS. 6–8 and to FIG. 1, the pixel blocks in FIGS. 6–8 each represent a 2×2 block of binary pixels at the 600 dpi resolution. Thus, all the pixel block shown in FIG. 6 are subject to be transformed to a grey level 2 at the 300 dpi resolution. However, in doing so, sharpness information is lost since the information representing the pixel location is lost. To further improve sharpness, the invention proposes that the sharpness information be retained by providing a two-bit code to distinguish 3 types of 2×2 pixel blocks. The pixel block illustrated in FIG. 6(a) represents one type of block, pixel blocks illustrated in FIGS. 6(b)–6(e) represent a second type of pixel block and pixel block 6(f) represents a third type of pixel block. The reason for the breakdown as such is that with a multiple address LED printer, each LED of the printer is capable of recording a grey level pixel using a binary (i.e., either on or off recording status) by recording the grey level pixel using some but not necessarily all of the 8 subscan lines. With a 300 dpi LED printhead, it is possible to transmit data thereto at every 1/2400 inches of incremental movement of the recording member past the printhead in the subscan (in-track) direction. The 300 dpi limitation only exists in the mainscan or cross-track direction due to the fixed nature of the LEDs relative to each other. Thus, in addition to the information representing grey level of the 300 dpi pixel and classification (character-graphic vs. pictorial), there may be further provided a two-bit signal representing pixel block type or sharpness identification information that are input into LUT member 120. In this example, LUT memory 120 will have exposure values that vary in accordance with the three types of inputs so that for recording a grey level pixel such as that of FIG. 6(a), the pixel exposure data sent to the printhead for the LED that is recording that pixel will cause exposures that commence early in the pixel cycle and terminate before the middle of the pixel cycle. More specifically, since there are eight possible subscan exposure lines 0, 1, 2, 3, 4, 5, 6, and 7, data for recording the grey level 2 pixel of FIG. 6(a) type can be recorded during, say, subscan lines 1, 2 and 3 to provide a generally upwardly shifted pixel. Data for recording a grey level 2 pixel derived from original binary bit maps of the type shown in FIGS. 6(b)–6(e) can be recorded during subscan lines 3, 4 and 5 to provide a generally centered pixel. The grey level 2 pixel of FIG. 6(f) type can be recorded during, say, scan lines 4,5 and 6 to record the pixel so that the pixel is shifted downwardly to preserve the pixel sharpness information. Since correction is employed in this printhead for nonuniformity, there may be more than 2 or 3 subscan lines used to record a grey level pixel. However, the nature of these exposures will be such as taught above to shift the position of the exposed pixels. The different subscan lines may have different weighted exposures. For example, subscan lines 2, 4 and 6 may have exposure durations that are longer than the other subscan lines so that grey level 2 pixels exposed using one of these sublines will be either shifted upwardly, centered or shifted downwardly to preserve sharpness information of the original 600 dpi binary bit map.

With reference now to FIG. 7, the pixel blocks of grey level 1 (300 dpi resolution bit map) may be printed by having sharpness information designate printing of pixels FIG. 7(a) and (b) shifted upwardly while pixels FIGS. 7(c) and 7(d) are shifted downwardly. This shifting will be in accordance with data stored in LUT memory 120 for grey level 1 pixels so that an upwardly shifted pixel might be recorded during subscan lines 1,2 while a downwardly shifted pixel is printed using subscan lines 5,6. Again, the number of scan line exposures will vary from LED to LED due to need to correction for nonuniformities. With reference to FIG. 8, grey level 3 pixels may be printed basically centered using the appropriate number of subscanning lines, say up to 8 lines but typically 5 or more.

Description will now be made to an embodiment of the invention used with a grey level printhead. An example of a grey level printhead is illustrated in U.S. Pat. No. 5,025,322, the contents of which are also incorporated herein by this reference. In such a printhead, plural data bits per pixel may be simultaneously provided to the printhead to determine an exposure duration or intensity for recording that pixel by a respective recording element. In such a printhead, a 2-bits per pixel grey level data signal is corrected to say a 6-bits per pixel corrected data signal that is transmitted to the printhead. Two sets of correction data are provided, one for each type of pixel classification to accomplish the type of exposure scheme illustrated in FIG. 2. The 6-bits corrected data signal per pixel is latched on the printhead and used to control an exposure duration for each LED by comparison with a time-based signal. A flowchart for operation of the invention with the grey level printhead is similar to that illustrated in FIG. 1.

The following description will be made with reference to a grey level multiple addressed printhead of FIG. 9 wherein multiple address printing is employed with a grey level LED printhead to preserve sharpness information. In such a grey level printhead 210, multiple subscan lines are similarly used to record a pixel but for each subscan line the duration for recording is varied in accordance with a multibit data signal for controlling the exposure time of an LED during that subscan line period. In this regard, multiple address grey level printers are described in the aforementioned U.S. Pat. No. 5,025,322. Generally, in a multiple address printer there are N recording elements per inch arranged in a row in the main scan (cross-track) direction and M sublines per inch in the subscan (in-track) direction are used to record wherein M is greater than N. Typically, a pixel will have an appropriate dimension 1/N×1/N so that M/N subscan lines are used to record the pixel. For example, N may be 300 and M may be 2400 where a 300 dpi printhead is used and 8 subscan lines used to record a grey level pixel. By selectively storing the data in the look-up table memory 216 in accordance with sharpness information, the pixel may be shifted upwardly, downwardly or made centered in accordance with such data.

Figure 9:
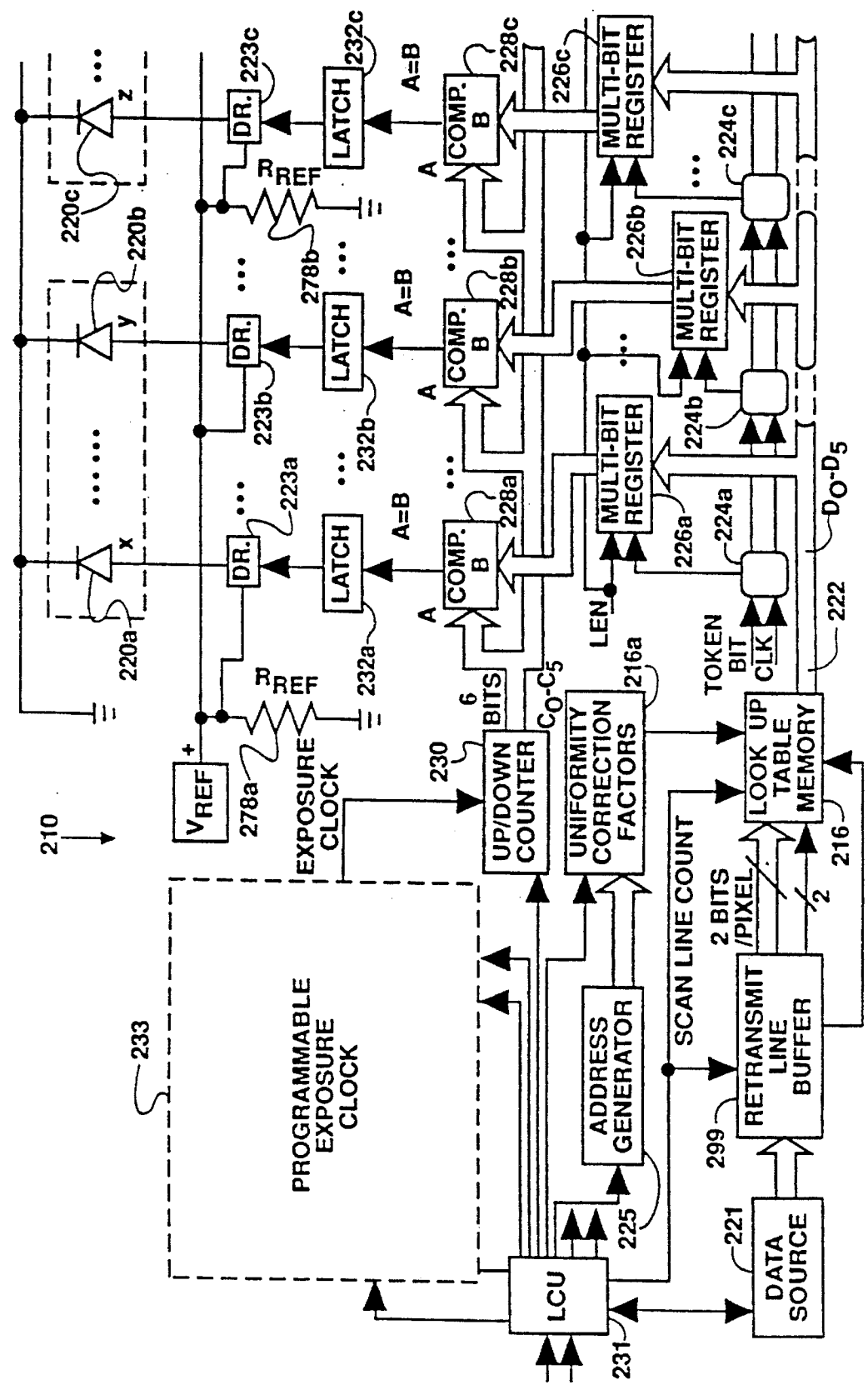
FIG. 9 is an illustration of a multiple addressed grey level printhead that is in accordance with another embodiment of the invention.

In FIG. 9, a circuit is shown which may be used for triggering selectively the LEDs 220 that together comprise the printhead 210. Only a few of the LEDs and its associated driver circuitry are shown for clarity purposes, it being understood that the circuitry for driving such other LEDs is similar to that described for the illustrated examples. While the figure shows all the driver circuitry associated with the LEDs located to one side of the line of LEDs, it is well known to place these circuits on both sides of the line of LEDs to provide more efficient utilization of space. Assume, for example, that 3584 LEDs are arranged in a row and that the LEDs are uniformly spaced at 300 dpi.

Data to be printed for each subscan line is in the form of binary digital signals, e.g., 1's and 0's. This data on lines labeled $D_0$–$D_5$ are outputted in parallel onto the data bus 222. The data on lines $D_0$–$D_5$ comprises, in this example, a six-bit digital signal representing an exposure time for a particular LED for recording during a subscan line interval. Synchronously with the generation of each six-bit data signal, there is generated by, for example, a logic and control unit (LCU) 231 a token bit signal which is a single bit that is shifted down a shift register formed by a plurality of individual registers 224a, 224b, 224c, etc. Each such register is associated with a particular LED. This token bit determines which of the LEDs a particular set of data on bus 222 is intended. In operation, a series of six-bit data signals are provided on bus 222 and one six-bit signal is latched by each of the respective 3584 multibit registers 226a, 226b, 226c, . . . etc. associated with an LED. The latching being in response to the presence of the token bit in the particular register 224a or 224b or 224c, etc. Further description relative to a circuit for selectively latching this data in provided in U.S. Pat. No. 4,746,941, entitled "Dot Printer With Token Bit Selection of Data Latching," the contents of which are incorporated herein by this reference. After a six-bit data signal is stored in each of the multi-bit registers, a latch enable (LEN) signal is provided by the LCU 231 to shift this six-bit signal to an output stage or latch of each register so that a six-bit level data signal (say decimal 10 for LED 220a for this particular subscan line period) is output to one input terminal (B) of a respective digital comparator 228a, 228b, 228c, etc. associated with each LED. At this point in time a digital counter 230 is enabled by LCU 231 to count down in this example from decimal 63 ($2^6$–1) to 0. The output of the counter 230 is a six-bit signal, in this example ($C_0$–$C_5$) representing in digital form a number or count which changes periodically in accordance with clock pulses from a programmable clock 233. With each pulse (or trailing edge of same) from clock 233, the counter changes its count at its output. The output of counter 230 is input into each of the input terminals (A) of the digital comparator. Thus, the comparators now compare the signals at their respective A and B inputs in accordance with the comparators criteria for operation, i.e. is A equal B? When the counter output by the counter 230 and inputted at terminal A is equal to a respective input data signal count input at terminal B (decimal 10, for example, but can be any number between 1 and 63) the output of a respective comparator goes to a digital logic high level and is latched at a respective latch register 232a, 232b, 232c, etc. The latched signals allow drivers 223a, 223b, 223c to be enabled, at the rising edge of the next clock pulse from programmable or variable clock 233, to commence and maintain current respectively to LEDs 220a, 220b or 220c, etc. After the counter 30 counts down to zero, the counter 230 is either reset by the next clock pulse into a counter-up mode or is inhibited from counting additional clock pulses for a minimum period $T_{MIN}$ that is programmed into the counter or provided by other suitable means. After this predetermined time period $T_{MIN}$, the counter is set to count in its count-up mode and commences counting clock pulses again. When the counter output in its count-up mode reaches decimal 10, the output of comparator 228a changes and the latch 232a is reset and current to the LED 220a ceases. The other LEDs 220b, 220c etc. operate in similar fashion but their data will require different count values to turn on and off in accordance with grey scale data provided in their respective multibit registers. The invention also contemplates that just an up or just a down counter can also be used. The current level to each LED is the same but the pulse duration for each LED during each subline of print is varied. In this embodiment the LEDs may be initially "balanced" such as by adjusting a "trim" resistor 278a, associated with each driver chip; see U.S. Pat. No. 4,831,395. Other known techniques for balancing output of the recording elements may also be provided; see for example, U.S. Pat. Nos. 5,126,759 and 4,885,597. In addition, further balancing or correction for unequal light output may be provided by adjustment of data in accordance with the characteristics of each LED. Thus, the memory device such as a look-up table memory 216a or programmable read-only memory device or PROM may store the characteristics of each LED and data for that LED can be modified to provide an input count at terminal B that represents data modified by the exposure characteristics of the LED. For example, for an LED that is a relatively strong light emitter the PROM would modify data bits for that LED to reduce the count that otherwise would be provided at terminal B based solely on the data.

In addition to a two-bit grey level signal, the memory 216 receives (for each of 8 subscan lines for recording a pixel) inputs of sharpness information, an indication that the data represents character-graphic or pictorial information, scan line count and LED uniformity correction data. The two-bit grey level signal is provided from a retransmit line buffer 299 which in turn stores the 300 dpi grey level resolution data from data source 221. This 300 dpi two-bit grey level data is derived, in similar fashion as described above, from a 600 dpi binary bit map. The retransmit line buffer 299 stores a line of pixel grey level data, i.e., 3584×two-bits plus pixel classification and sharpness information data and retransmits this data 8 times under control of a counter in LCU 231 that counts subscan lines based upon encoder pulses. In response to the various signals input into LUT memory 216 a six-bit signal is output that will adjust the recording time for a particular subline in accordance with the characteristics of the LED (note uniformity correction table 216a), sharpness correction (which as taught above will cause the resulting printed pixel to be either shifted upwardly, downwardly or centered), and exposure skewing for character-graphic information. In the case of sharpness correction, the LUT memory 216 in response to scanline number counts, for recording, say a grey level 2 pixel) outputs exposure data signals ($D_0$–$D_5$) during the early subline counts, say sublines 0, 1, 2, 3 with no such exposure data signals (i.e., $D_0$–$D_5$ are now all 0 for that particular LED) during subline counts 4 through 7. Thus, the exposure of that pixel would tend to be shifted upwardly. Where the pixel is to be recorded is a character-graphic pixel the exposure durations during each subscan line interval may be skewed towards the high end as described above. The appropriate grey level pixel is thus recorded by each LED over the interval wherein the recording medium has moved a distance of eight subscan lines wherein each subscan line is spaced 1/2400 inches. Thus, a multiple addressed grey level printer is described that can provide sharpness correction in printing of data from a high resolution binary bit map even though the printer is of lower resolution than the bit map.

Figure 11:
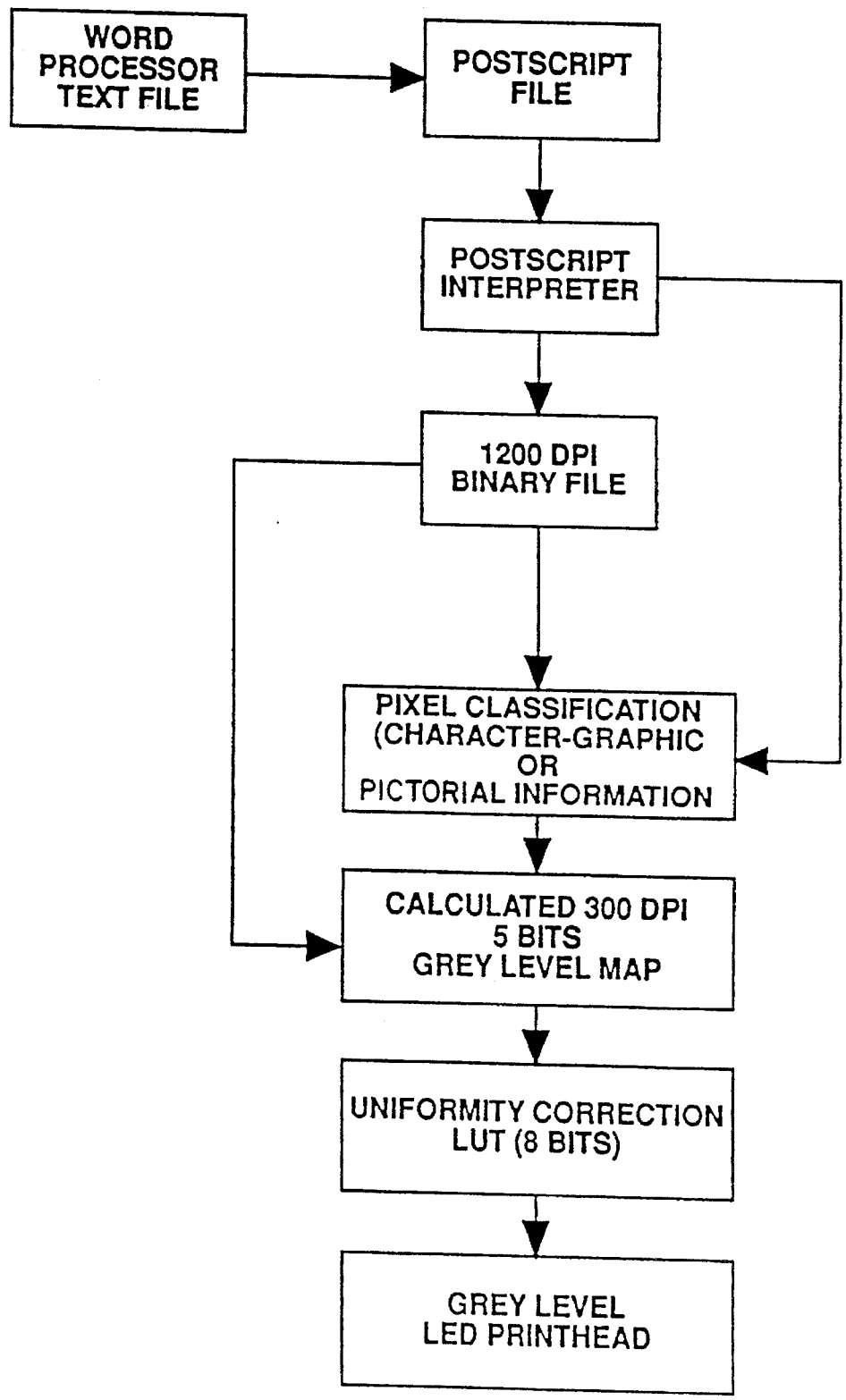
FIG. 11 is a flowchart illustrating another embodiment of the printing method of the invention in conjunction with a grey level printer.
Figure 12:
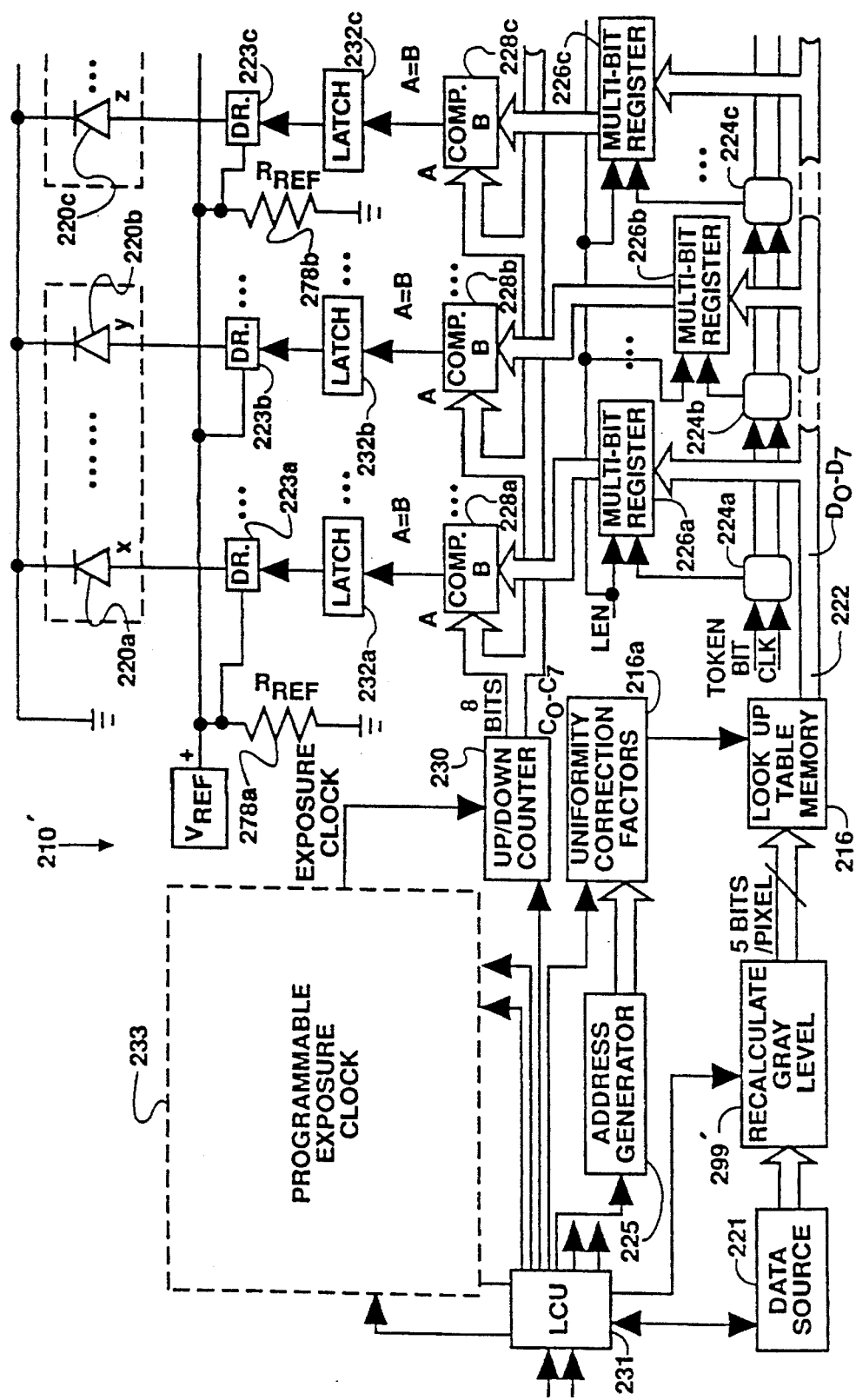
FIG. 12 is an illustration of a grey level printhead for use with the method of FIG. 11.

With reference now to FIGS. 10–12, still another embodiment of the invention will be described with reference to a grey level printer. In this embodiment, a high resolution binary bit map of a text file is converted into a lower resolution grey level file for printing by a grey level printer such as that illustrated in FIG. 12 and which is similar to that described, for example, in FIG. 2 of U.S. Pat. No. 5,025,322, the pertinent contents of which are incorporated herein by this reference. In addition, the printer of U.S. Pat. No. 5,126,759 is also pertinent and incorporated herein by reference.

With reference to FIG. 10(a), assume in this example that the binary data file has a resolution of 1200 dpi (both in-track and cross-track) and is to be converted to a 300 dpi grey level map. The particular grey level printer used in this example is not capable of shifting location of pixels but merely creates a different sized pixel at a particular location having a common center point. In order to give the appearance of shifting of pixels for edge enhancement of text, the grey level pixel map is developed in accordance with an algorithm that will be described with reference to the examples of FIGS. 10(a)–(g). In the example of FIG. 10(a), the current 4×4, 1200 dpi pixel block is examined with reference to neighbor blocks above and below and, as will be more apparent in other examples, with reference to data in the adjacent row U of the upper pixel block and the adjacent row L of the lower pixel block. In this example, the current pixel block is assigned a grey level of 8 which is the sum of the binary pixels in this block.

In the example of FIG. 10(b) the current pixel block, even though it, too, has 8 binary pixels, is assigned a grey level of 4 and the upper pixel block is recalculated to grey level 20. Thus, by overgrowing the pixel in the upper pixel block, which normally would be a grey level 16, and undergrowing the pixel in the current pixel block, the appearance of the edge is enhanced upwardly. The example of FIG. 10(c) illustrates a similar example with the edge enhanced downwardly. Thus, there is an apparent cell position shift in the upper or lower direction due to the cell size variation by suitably pulsewidth-modulating of the exposure time for creating the various grey level pixels. This serves to preserve sharpness information on the original 1200 dpi binary file.

The examples of FIGS. 10(d)–10(g) show the recalculated 300 dpi grey levels for the current pixel and its upper and lower adjacent pixel blocks for the illustrated 4×4, 1200 dpi pixel blocks. Generally, the recalculation or output value (o.v.) of grey level value for the current 4×4 pixel block under consideration is:

$$o.v. = V_{CURRENT} - a\, U - b\, L$$

where $V_{CURRENT}$ is the sum of the binary pixels in the current 4×4 pixel block under consideration, "a" and "b" are either 0, 1, −1 in accordance with rules set forth below and U and L are the number of binary pixels in the adjacent upper row and lower rows, respectively. (See FIG. 10(a)).

The rules for determining "a" and "b" involve the consideration of the values for the current 4×4 pixel block, $V_{CURRENT}$, and the upper and lower pixel blocks, $V_{UPPER}$ and $V_{LOWER}$, respectively.

If $V_{CURRENT} > 8$, $V_{UPPER} > 8$, then a=o;

If $V_{CURRENT} > 8$, $V_{LOWER} > 8$, then b=o;

If $V_{CURRENT} \leq 8$, $V_{UPPER} \leq 8$, then a=o;

If $V_{CURRENT} \leq 8$, $V_{LOWER} < 8$, then b=o;

If $V_{CURRENT} > 8$, $V_{UPPER} \leq 8$, then a=−1 if more than 2 out of 4 binary pixels in row U are a value 1, if not a=0;

If $V_{CURRENT} \leq 8$, $V_{LOWER} \leq 8$, then b=−1; if more than 2 out of 4 binary pixels in row L are value 1, if not b=o;

If $V_{CURRENT} \leq 8$, $V_{UPPER} > 8$, then a=1 if 4 uppermost pixels of the current cell are value 1, if not a=o;

If $V_{CURRENT} \leq 8$, $V_{LOWER} > 8$, then b=1 if 4 lowermost pixels of the current cell are value 1, if not b=o;

In addition, if there is a calculated gain in grey level value of the current pixel block due to contributions from the upper and/or lower pixel blocks, there is a commensurate reduction respectively in the grey level values of the upper and/or lower pixel blocks, and similarly, if there is a calculated loss in grey level value of the current pixel block and such loss is due to factors caused by the upper or lower pixel blocks than the upper or lower pixel block is recalculated accordingly.

As may be seen, the output value of each of the 300 dpi grey level pixel blocks can be from 0 to 24 and defined using 5-bits per grey level pixel. A similar shifting scheme may be composed for providing the appearance of left and right shifting.

With reference to FIG. 12, a grey level LED printhead 210' is illustrated that includes functional elements similar to that described for FIG. 9 with similar numerals representing similar elements to that described for the aforedescribed printhead. However, in this embodiment the data for the data source is recalculated as described above by a suitable device 299' and generates a 5-bits per pixel grey level data signal that is input to LUT 216. The LUT 216 outputs an 8-bit corrected data signal that is used to control the exposure duration and/or intensity for recording the grey level pixel as described above. As is well known for such printheads, signals such as exposure clock, data and data correction and LED address generation may be all generated of the printhead itself and conducted thereto by suitable conductors. The various calculation steps described may be implemented using dedicated chips, a computer and/or lookup table memories.

While the invention has been described with reference to LED arrays, the invention in its broader aspects also contemplates that a laser may be used. One advantage of a laser is that they may also provide for left, center or right image sharpness correction as well as up and down pixel shift due to the ability to adjust positioning of the laser in the mainscan (cross track) direction as well as controlling exposures during subscan lines for up or down pixel shifting. Similarly, the laser may be controlled by adjusting exposure duration or intensity for skewing exposures to increase same as described above for recording character-graphic images in reversal development electrophotographic recording apparatus.

There has thus been provided an improved method and apparatus for printing of high resolution binary data using low resolution printers without substantial loss of detail in the image produced.

The invention has been described in detail with particular reference to preferred embodiments thereof, but it will be understood that variations and modifications can be effected within the spirit and scope of the invention.

I claim:

1. A method of printing a high quality image using a printer that includes a printhead of a low resolution, said method comprising the steps of:

inputting a high resolution binary data image file of said image represented in binary data form that is of higher resolution in one scan direction than said low resolution;

sequentially operating on blocks of data from said binary data file to define multibit grey level pixel data of said low resolution for recording by said printer; and printing said pixel data to form the image by operating the printhead to record grey level pixels on a recording medium at said low resolution.

2. A method of claim 1, wherein the multibit data is corrected before printing by the printer.

3. A method of claim 2, wherein a grey level pixel is recorded using plural sublines to record said pixel.

4. The method of claim 3, wherein the printhead records the pixels by emitting light from a recording element to expose an electrophotographic recording member and the grey level pixels are recorded using discharged area development.

5. The method of claim 4, wherein said image file includes text and pictorial pixels and exposure times for recording text pixels by the recording element are skewed towards long exposures as compared to exposure times for recording pictorial pixels by the recording element.

6. The method of claim 1, wherein said image file includes text and pictorial pixels and grey level recording of a text pixel by the printer is skewed towards higher density recording as compared to recording of a pictorial pixel having an identical grey level.

7. The method of claim 1, wherein said image file includes text and pictorial pixels and at least one grey level exposure time for recording a pictorial pixel by a recording element of the printer is of shorter duration than a corresponding grey level exposure time for recording a text pixel by the recording element.

8. The method of claim 2, wherein a grey level pixel is recorded using a grey level printhead.

9. The method of claim 8, wherein the printhead records pixels by emitting light from a recording element to expose an electrophotographic recording member and the grey level recorded pixels are recorded using discharged area development.

10. The method of claim 7, wherein at least one exposure time for recording a text pixel by the recording element is longer than a corresponding exposure time for recording of a pictorial pixel by the recording element.

11. The method of claim 1, wherein the printhead records grey level pixels by emitting light from a recording element to expose an electrophotographic recording member and the grey level pixels are recorded using discharged area development.

12. The method of claim 11, including generating a signal relative to data bit location in a block of binary data bits, which block is a subset of said binary data file, and in response to said signal causing a recorded grey level pixels position to be shifted.

13. The method of claim 1, including generating a signal relative to data bit location in a block of binary data bits, which block is a subset of said binary data file, and in response to said signal causing a recorded grey level pixel position to be shifted.

14. The method of claim 13, wherein the printhead records the pixels by emitting light to expose an electrophotographic recording member and the grey level pixels are recorded using discharged area development.

15. The method of claim 1, wherein the printhead records the pixels by emitting light to expose an electrophotographic recording member and the grey level pixels are recorded using discharged area development.

16. A method of non-impact printing with high quality using a printhead of relatively low resolution, said method comprising the steps of:

inputting as an address into a memory a multibit digital data signal representing a grey level of a pixel to be recorded and a second signal indicating classification of the pixel as either a text pixel or not a text pixel;

outputting from said memory a third signal representing an exposure parameter wherein the exposure parameter differs in accordance with said classification; and using said third signal to control said printhead for recording said pixel.

17. The method of claim 16, wherein said pixel is recorded over plural subscan recording periods.

18. The method of claim 16, including generating said multibit digital data signal from a binary data file of a first resolution wherein pixels are each represented in the file by a single data bit per pixel and sequentially operating on blocks of data from said binary data file to generate a grey level data file of a second resolution that is lower than said first resolution wherein in said grey level data file pixels are each represented by multibits per pixel.

19. A method of non-impact printing comprising the steps of:

generating signals representing a binary data file of a first resolution;

sequentially operating on blocks of data from said binary data file to generate a grey level data file of a second resolution that is lower than said first resolution;

inputting into a memory a multibit digital data signal representing a grey level of a pixel to be recorded and a second signal representing locations of data bits in one of said blocks of data;

outputting from said memory a third signal representing an exposure parameter wherein the exposure parameter differs in accordance with said second signal; and using said third signal to control a printhead for recording said pixel.

20. The method of claim 19, wherein said pixel is recorded over plural subscan recording periods.

21. The method of claim 19, in addition inputting into said memory a fourth signal representing whether or not said pixel is text information.

22. The method of claim 21, wherein the exposure parameter is exposure duration.

23. The method of claim 20, wherein the exposure parameter is exposure duration.

24. The method of claim 19, wherein the exposure parameter is exposure duration.

25. An apparatus for printing high quality text with a low resolution printhead, said apparatus comprising:

means for inputting a high resolution binary data text file of said text represented in binary data form in a first resolution;

means for sequentially operating on blocks of data from said binary data file to define multibit grey level pixel data of lower resolution than said first resolution; and printing means for printing said pixel data to form the text by recording grey level pixels on a recording medium at the lower resolution.

26. The apparatus of claim 25, wherein the printing means includes a plurality of light-emitting diodes.

27. The apparatus of claim 26, wherein the recording medium is an electrophotoconductive member.

28. The apparatus of claim 27, including control means for controlling an exposure duration of a light-emitting diode in response to a signal classifying a pixel as text.

29. The apparatus of claim 28, wherein said control means includes means for shifting of a recorded pixel in response to location of data in said binary data file.

30. A method of printing high quality text using a printer that includes a printhead of a low resolution, said method comprising the steps of:

(a) sequentially operating on blocks of data from a data text file of a high resolution and calculating multibit grey level pixel data of said low resolution for recording by said printer; and (b) printing said pixel data to form the text by operating the printhead to record grey level pixels on a recording medium at said low resolution.

31. The method of claim 30, wherein in step (a) a block of data of the high resolution is added to define a grey level value for a pixel to be recorded at the low resolution.

32. The method of claim 30, wherein in step (a) a grey level value of a pixel of the low resolution is calculated by obtaining a sum of binary values in a block of data of the high resolution.

33. The method of claim 32, wherein in step (a) a grey level value of a pixel of the low resolution is further calculated by adjusting said sum in accordance with factors associated with adjacent pixel blocks.

34. The method of claim 33, wherein the printhead records the pixels by emitting light to expose an electrophotographic recording member and the grey level pixels are recorded using discharged area development.

* * * * *